(12) United States Patent
Fukui

(10) Patent No.: US 9,009,776 B2
(45) Date of Patent: Apr. 14, 2015

(54) INFORMATION PROCESSING APPARATUS AND OUTPUT CONTROL METHOD

(71) Applicant: Kabushiki Kaisha Toshiba, Tokyo (JP)

(72) Inventor: Kotaro Fukui, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 5 days.

(21) Appl. No.: 13/903,910

(22) Filed: May 28, 2013

(65) Prior Publication Data
US 2013/0258194 A1 Oct. 3, 2013

Related U.S. Application Data

(63) Continuation of application No. 12/180,353, filed on Jul. 25, 2008, now abandoned.

(30) Foreign Application Priority Data

Aug. 6, 2007 (JP) .................................. 2007-204608

(51) Int. Cl.
*H04N 7/16* (2011.01)
*H04N 21/4363* (2011.01)
(Continued)

(52) U.S. Cl.
CPC ......... *H04N 21/43635* (2013.01); *H04N 21/41* (2013.01); *H04N 21/426* (2013.01); *H04N 21/42653* (2013.01); *H04N 21/439* (2013.01); *H04N 21/44* (2013.01); *H04N 21/443* (2013.01); *H04N 21/233* (2013.01); *H04N 21/234* (2013.01); *G06F 3/1454* (2013.01);
(Continued)

(58) Field of Classification Search
CPC ... H04N 21/233; H04N 21/234; H04N 21/41; H04N 21/426; H04N 21/42653; H04N 21/439; H04N 21/44; H04N 21/443; H04N 21/43635
USPC .................. 725/135, 139–142, 143, 151–153
See application file for complete search history.

(56) References Cited

U.S. PATENT DOCUMENTS 7,065,287 B1 * 6/2006 Heredia et al. ................. 386/281
7,975,051 B2 * 7/2011 Saint Clair et al. ........... 709/225
(Continued)

FOREIGN PATENT DOCUMENTS

| JP | 07-192443 | 7/1995 |
|----|-----------|--------|
| JP | 9292867 | 11/1997 |

(Continued)

OTHER PUBLICATIONS

Japanese Patent Application No. 2008-158100, Notice of Reasons for Rejection, mailed Oct. 26, 2010, (with English Translation).
(Continued)

*Primary Examiner* — Jeremy Duffield
(74) *Attorney, Agent, or Firm* — Blakely, Sokoloff, Taylor & Zafman LLP

(57) ABSTRACT

According to one embodiment, an information processing apparatus includes a display, a speaker, a connector to output a video signal and audio signal, a display driving module to control outputting of the video signal with respect to the display and connector, a sound driving module to control outputting of the audio signal with respect to the speaker and connector, and an output control module to instruct the sound driving module to output the audio signal from the connector when an event of instructing the display driving module to output a video signal to the connector occurs.

15 Claims, 6 Drawing Sheets

(51) Int. Cl.

| | | |
|---|---|---|
| *H04N 21/41* | (2011.01) | |
| *H04N 21/426* | (2011.01) | |
| *H04N 21/439* | (2011.01) | |
| *H04N 21/44* | (2011.01) | |
| *H04N 21/443* | (2011.01) | |
| *H04N 21/233* | (2011.01) | |
| *H04N 21/234* | (2011.01) | |
| *G06F 3/14* | (2006.01) | |
| *H04N 5/44* | (2011.01) | |
| *H04N 21/4143* | (2011.01) | |
| *G09G 5/00* | (2006.01) | |
| *G09G 5/36* | (2006.01) | |
| *H04N 5/60* | (2006.01) | |

(52) U.S. Cl.
CPC ............ *G09G 5/006* (2013.01); *G09G 5/363* (2013.01); *G09G 2370/12* (2013.01); *H04N 5/60* (2013.01); *H04N 5/4401* (2013.01); *H04N 21/4122* (2013.01); *H04N 21/4143* (2013.01)

(56) References Cited

U.S. PATENT DOCUMENTS

| | | | |
|---|---|---|---|
| 2002/0019881 A1* | 2/2002 | Bokhari et al. ............ 709/246 |
| 2002/0049881 A1 | 4/2002 | Sugimara | |
| 2003/0020763 A1* | 1/2003 | Mayer et al. ............ 345/838 |
| 2003/0046557 A1 | 3/2003 | Miller et al. | |
| 2003/0185400 A1* | 10/2003 | Yoshizawa et al. ............ 381/58 |
| 2006/0048062 A1 | 3/2006 | Adamson | |
| 2006/0089735 A1* | 4/2006 | Atkinson ............ 700/94 |
| 2007/0165038 A1* | 7/2007 | Chiba et al. ............ 345/520 |
| 2009/0040381 A1 | 2/2009 | Fukui | |

FOREIGN PATENT DOCUMENTS

| | | |
|---|---|---|
| JP | 2003-111166 | 4/2003 |
| JP | 2004-201215 | 7/2004 |
| JP | 2006-108855 | 4/2006 |

OTHER PUBLICATIONS

GroupMedia/Conference Operating Instructions, Kabushiki Kaisha Toshiba, Jan. 30, 1997, C1th, pp. 50 and 51.

Windows Vista & IE7 Quick-Acting "Setting" Dictionary, ASCII Corporation, May 1, 2001, pp. 30 and 31, Separate-volume Supplement to the May 2007 number of ASCII dot PC.

Point to Notice When Connecting HDMI-capable Display/Television, NEC Personal Products, Ltd., Jan. 2007, GL23ES/Y6 attached manual, URL, http://12ware.com/e-manual/m/nx/lg/200701/pdf/hdt/v1/mst/853_810603_790_a.pdf.

Japanese Patent Application No. 2007-204608, Notice of Reasons for Rejection, mailed Jul. 7, 2009, (with English Translation).

U.S. Appl. No. 12/180,353, Non-Final Office Action, mailed Feb. 10, 2012.

U.S. Appl. No. 12/180,353, Non-Final Office Action, mailed Oct. 31, 2012.

U.S. Appl. No. 12/180,353, Final Office Action, mailed Feb. 28, 2013.

U.S. Appl. No. 12/180,353, Final Office Action, mailed May 25, 2012.

\* cited by examiner

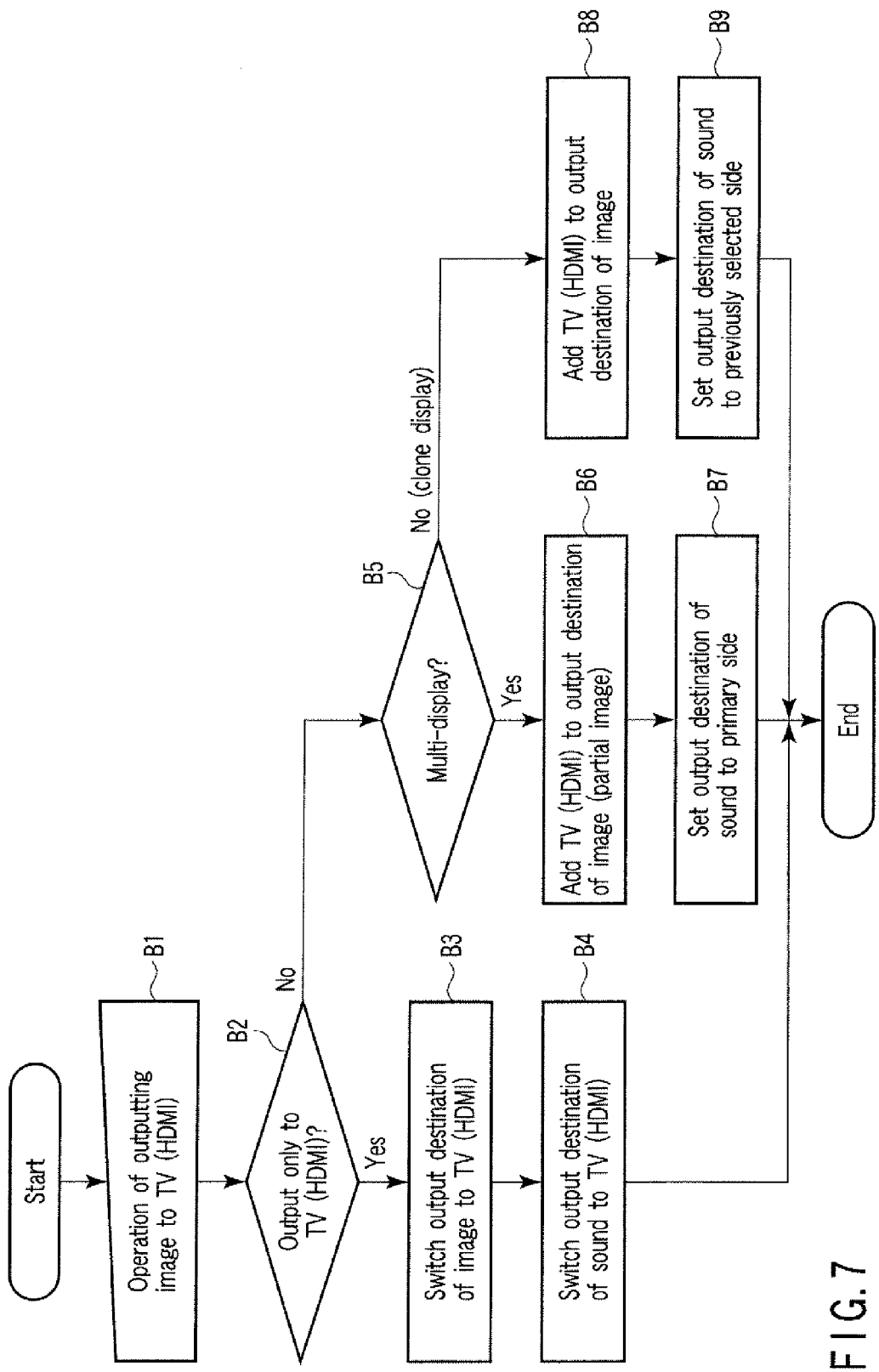
F I G. 7

INFORMATION PROCESSING APPARATUS AND OUTPUT CONTROL METHOD

CROSS-REFERENCE TO RELATED APPLICATIONS

This application is a continuation of U.S. application Ser. No. 12/180,353, which is based upon and claims the benefit of priority from Japanese Patent Application No. 2007-204608, filed Aug. 6, 2007, the entire contents of which are incorporated herein by reference.

BACKGROUND

1. Field

One embodiment of the invention relates to an audio signal output control technique that is preferably applied to a personal computer including an image playback function capable of transmitting a video signal to a television broadcast receiver, for example.

2. Description of the Related Art

In recent years, personal computers including functions of permitting users to receive and view television broadcast program data and play back audiovisual (AV) content stored on Digital Versatile Discs (DVDs) are widely used. Therefore, the user can utilize image data (containing audio) while he is moving or in a position where he has gone to if the user carries a notebook personal computer that can be battery-driven, for example.

Further, recently, the quality of a video image is further enhanced and personal computers capable of playing back high-definition image data stored in recording media of a High-Definition (HD) DVD standard start to be widely used. Generally, this type of personal computer has a mechanism of outputting a high-definition video signal to the exterior and, for example, the user can enjoy a high-definition video image played back by the personal computer on a large-screen high-definition television broadcast receiver by connecting the personal computer to the large-screen high-definition television broadcast receiver when he is at home, for example.

The number of application configurations in which a plurality of electronic devices each having a function of playing back image data and audio data are connected to each other, for example, the above personal computer is connected to the television broadcast receiver is increased. Therefore, for example, various proposals for efficiently switching sources are made (for example, refer to Jpn. Pat. Appln. KOKAI Publication No. H7-192443).

Generally, the resource management of the personal computer is performed on the basis of a single principle by use of an operating system (OS) and the output destinations of video signals and audio signals are set under the control of the OS. At present, since interfaces for setting the above output destinations are individually prepared, it is required to perform the two operations of (1) switching the output destination of the video signal to a television broadcast receiver and (2) switching the output destination of the audio signal to the television broadcast receiver when the user wants to enjoy a high-definition image played back by the personal computer on the large-screen high-definition television broadcast receiver as described before.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 7 is an exemplary flowchart showing the operation procedure of an output control operation of an audio signal (with a video signal) performed by the information processing apparatus of the embodiment by taking the clone display and multi-display into consideration.

DETAILED DESCRIPTION

Various embodiments according to the invention will be described hereinafter with reference to the accompanying drawings. In general, according to one embodiment of the invention, an information processing apparatus includes a display, a speaker, a connector to output a video signal and audio signal, a display driving module to control outputting of the video signal with respect to the display and connector, a sound driving module to control outputting of the audio signal with respect to the speaker and connector, and an output control module to instruct the sound driving module to output the audio signal from the connector when an event of instructing the display driving module to output a video signal to the connector occurs.

Figure 1:
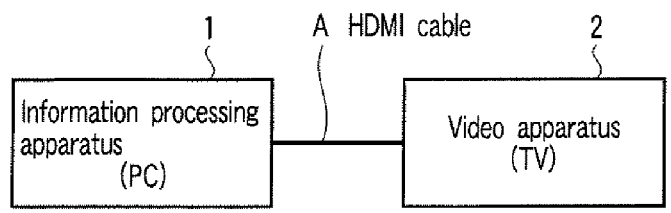
FIG. 1 is an exemplary diagram showing an application configuration of an information processing apparatus (personal computer) according to an embodiment of the invention.

In FIG. 1, one example of the application configuration of an information processing apparatus according to the present embodiment is shown. The information processing apparatus 1 is realized as a notebook personal computer (PC), for example.

In this example, as shown in FIG. 1, a case where the information processing apparatus 1 is connected to a video apparatus 2 via an High-Definition Multimedia Interface (HDMI) cable "A" is assumed. The video apparatus 2 is a large-screen high-definition television broadcast receiver (TV). In the information processing apparatus 1, various software (application programs) used to play back high-definition image data are installed and the user can enjoy a high-definition image played back according to the application programs on the video apparatus 2 by connecting the same to the video apparatus via the HDMI cable "A". Further, the information processing apparatus 1 and video apparatus 2 which are connected via the HDMI cable "A" can transmit various types of commands to each other to control the operations of the connected partners.

Next, the basic output control mechanism of a video signal and audio signal in the information processing apparatus 1 is explained with reference to FIGS. 2A and 2B. The resource management of the information processing apparatus 1 realized as a personal computer or the like is performed on the basis of a single principle by use of an OS and the operation of switching the output destinations of the video signal and audio signal or the like is controlled by a display driver and sound controller which are modules in the OS.

Figure 2A:
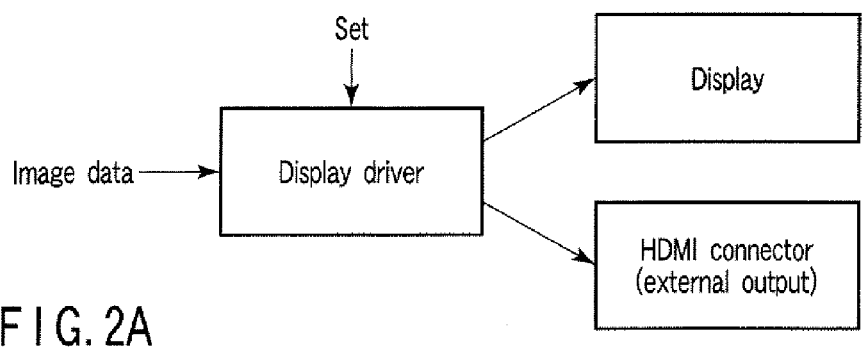
FIGS. 2A and 2B are exemplary diagrams showing basic output control mechanisms for a video signal and audio signal in the information processing apparatus of the embodiment.

More specifically, as shown in FIG. 2A, the video signal is so set as to be displayed on an LCD, for example, or output to the exterior via an HDMI connector by use of the display driver, or subjected to both of the display operation and outputting operation. For example, setting of switching from the display on the LCD or the like to outputting to the exterior via the HDMI connector is made by an explicit operation of the user or at the time of occurrence of various events, for example, when the power source of the information processing apparatus 1 is turned on in response to a command from the video apparatus 2.

Figure 2B:
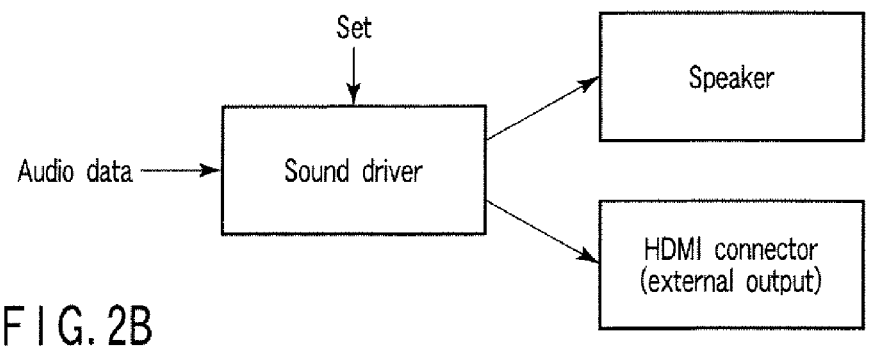

As shown in FIG. 2B, the audio signal is so set as to be output from a speaker, for example, or output to the exterior via an HDMI connector by use of a sound driver, or subjected to both of the outputting operations. The settings by the sound driver are completely independently made from the setting by the display driver (due to the specification of the OS).

Therefore, if the user considers that he/she will enjoy a video image played back by the information processing apparatus 1 on the video apparatus 2, he/she performs an operation of switching the output destination of the video signal to the video apparatus 2. At this time, (since the user generally wants to enjoy audio by use of the video apparatus 2,) the user performs an operation of switching the output destination of the audio signal to the video apparatus 2 in order to cause the audio signal to follow the video signal. The information processing apparatus 1 provides a mechanism that permits an operation of outputting the audio signal to the video apparatus 2 to be performed in conjunction with outputting of the video signal (without causing the user to perform a specified operation) and this is explained below in detail.

Figure 3:
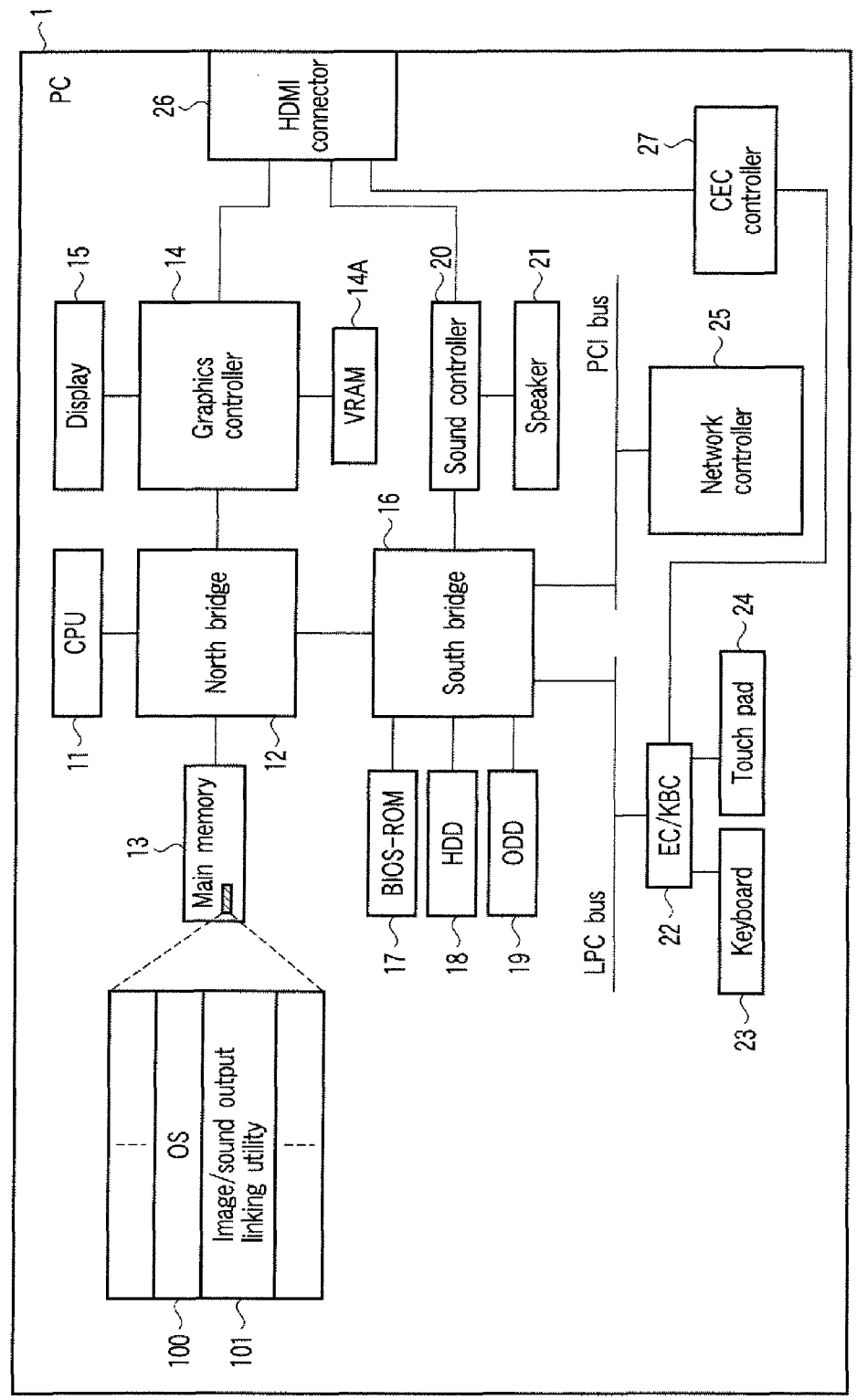
FIG. 3 is an exemplary diagram showing the configuration of the information processing apparatus of the embodiment.

FIG. 3 is an exemplary diagram showing the configuration of the information processing apparatus 1. As shown in FIG. 3, the information processing apparatus 1 includes a CPU 11, north bridge 12, main memory 13, graphics controller 14, VRAM 14A, display 15, south bridge 16, BIOS-ROM 17, hard disk drive (HDD) 18, optical disc drive (ODD) 19, sound controller 20, speaker 21, embedded controller/keyboard controller (EC/KBC) 22, keyboard 23, touch pad 24, network controller 25, HDMI connector 26, consumer electronics control (CEC: device-device bidirectional) controller 27 and the like.

The CPU 11 is a processor that controls the operations of the respective portions in the information processing apparatus 1. The CPU 11 executes an operating system (OS) 100 that is loaded from the HDD 18 into the main memory 13 and various programs, that is operated under the control of the OS 100, containing utilities and an application that deals with AV content. As one of the utilities, an image/sound output linking utility 101 which will be described later is present. Further, the CPU 11 executes a basic input/output system (BIOS) stored in the BIOS-ROM 17. In the following explanation, the basic input/output system itself stored in the BIOS-ROM 17 is referred to as the BIOS 17 in some cases.

The north bridge 12 is a bridge device that connects the local bus of the CPU 11 with the south bridge 16. The north bridge 12 has a function of communicating with the graphics controller 14 via a bus and contains a memory controller that controls access to the main memory 13. The graphics controller 14 is a display controller that controls the display 15 on the information processing apparatus 1 side. The graphics controller 14 generates a video signal to be output to the display 15 based on image data written into the VRAM 14A. Further, the graphics controller 14 has a function of outputting the video signal to the exterior from the HDMI connector 26.

The south bridge 16 is a controller that controls various devices on a PCI bus and LPC bus. Further, the south bridge 16 is directly connected to the BIOS-ROM 17, HDD 18, ODD 19 and sound controller 20 and has a function of controlling the above portions. For example, television broadcast program data and AV content and the like downloaded via the Internet are stored in the HDD 18 and an HD DVD that stores AV content is received in the ODD 19, for example. The sound controller 20 is a sound source controller that controls the speaker 21. The sound controller 20 has a function of outputting an audio signal to the exterior from the HDMI connector 26.

The EC/KBC 22 is a one-chip microcomputer obtained by integrating an embedded controller for power management and a keyboard controller that controls the keyboard 23 and touch pad 24. The network controller 25 is a communication device that communicates with an external network such as Internet, for example. The EC/KBC 22 is operated while the power source of the information processing apparatus 1 is kept off and monitors whether the power-on operation is performed or not, for example. Then, if an event suggesting that the power source should be turned on occurs, it performs the control operation to activate the information processing apparatus 1. Further, the EC/KBC 22 continuously supplies power to the CEC controller 27 while the power source of the information processing apparatus 1 is kept off.

The HDMI connector 26 is a terminal to which the HDMI cable "A" is detachably connected. The CEC controller 27 performs a data transmission control operation to transmit various commands for operation control via the HDMI connector 26 under the control of the EC/KBC 22. As one of the events for turning on the power source that is monitored by the EC/KBC 22, an event of receiving a power-on request command by the CEC controller 27 is present.

Figure 4:
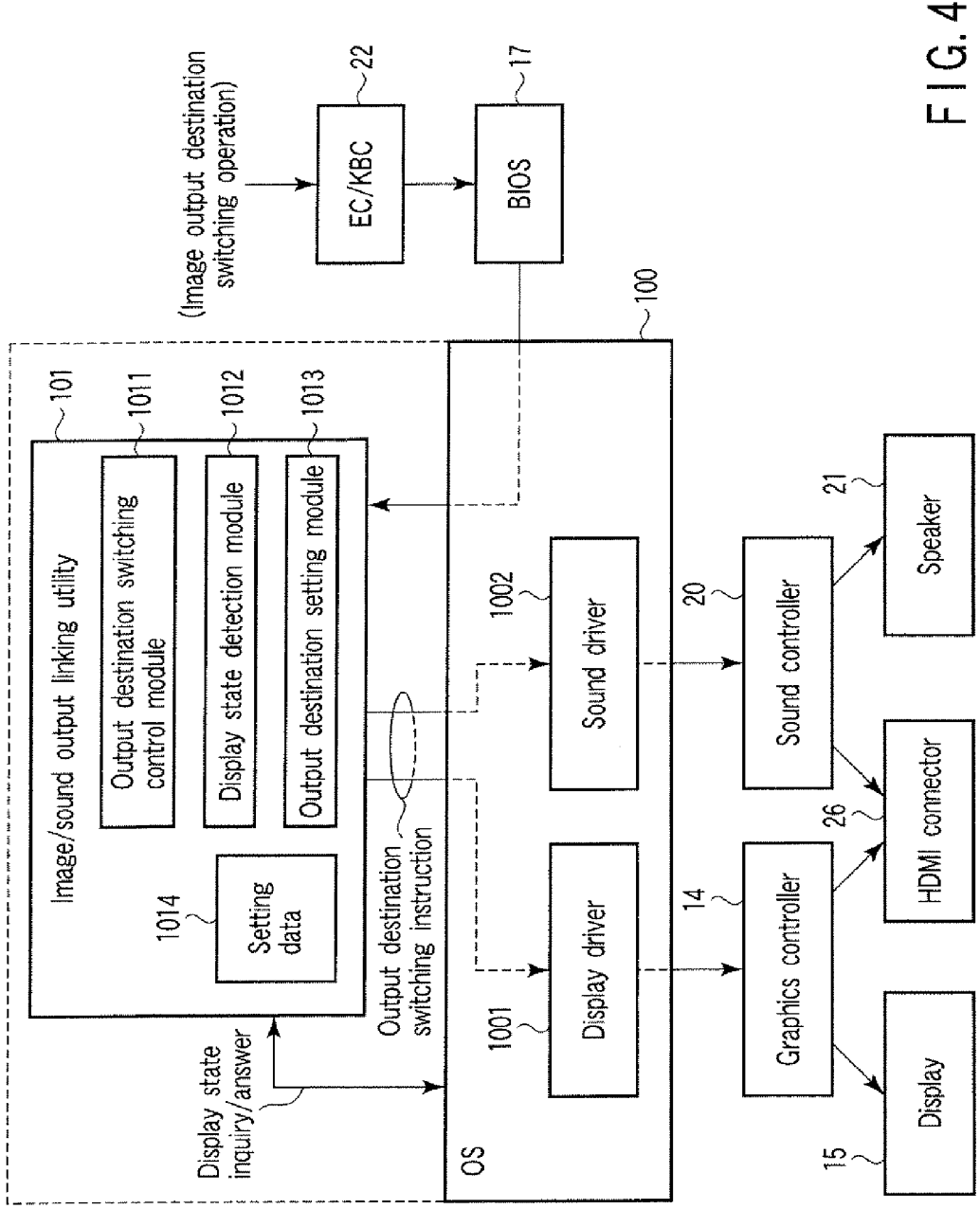
FIG. 4 is an exemplary diagram showing a function block associated with an output control operation of an audio signal (with a video signal) realized by the information processing apparatus of the embodiment.

FIG. 4 is an exemplary diagram showing a function block associated with a linked-output control operation of an audio signal (with a video signal) realized in the information processing apparatus 1 with the above configuration.

If an operation of switching the output destination of an image signal from the display 15 to the HDMI connector 26 is performed by use of the keyboard 23, for example, a key code corresponding to the keyboard operation is generated by the EC/KBC 22 and supplied to the OS 100 via the BIOS 17. Generally, a display driver 1001 that drives and controls the graphics controller 14 under the control of the OS 100 based on the above operation switches the output destination of a video signal from the display 15 to the HDMI connector 26. In a case where the above operation is performed in response to a command from the video apparatus 2, the EC/KBC 22 generates a key code corresponding to the keyboard operation when receiving a notification that the command is received from the CEC controller 27.

The image/sound output linking utility 101 is a program that automatically switches the output destination of the audio signal from the speaker 21 to the HDMI connector 26 in conjunction with the operation of switching the output destination of the video signal from the display 15 to the HDMI connector 26. The program is registered as a resident program that is always operated when the power source of the information processing apparatus 1 is set ON. In the information processing apparatus 1, the image/sound output linking utility 101 is provided in a specified path of output destination setting for the display driver 1001 and sound driver 1002. For this purpose, when a key code generated by the EC/KBC 22 is associated with the display driver 1001, the image/sound output linking utility 101 requests the OS 100 to notify occurrence of the above event.

The image/sound output linking utility 101 that is the resident program has an output destination switching control module 1011, display state detection module 1012 and output destination setting module 1013. The output destination switching control module 1011 has a function of giving an instruction to the display driver 1001 and giving an instruction of switching the output destination of the audio signal from the speaker 21 to the HDMI connector 26 to the sound driver 1002 as a basic function when receiving a notification from the OS 100 indicating occurrence of an event of switching the output destination of the video signal from the display 15 to the HDMI connector 26.

Thus, the output destination switching operation of the audio signal can be linked with that of the video signal although the output destination switching operations were required for the respective video signal and audio signal due to the specification of the OS 100. Therefore, the usability thereof by the user can be enhanced. The output destination switching control module 1011 automatically switches the output destination of the audio signal when the output destination of the video signal is set only to the HDMI connector 26. That is, when the state in which the output destination of the video signal is set only to the HDMI connector 26 is switched to the state in which the output destination of the video signal is set to both of the display 15 and HDMI connector 26, outputting of the audio signal from the speaker 21 is maintained. And, for example, the output destination of the audio signal is switched to both of the speaker 21 and HDMI connector 26 in response to an explicit operation instruction by the user. It is of course possible to automatically switch the output destination of the audio signal to both of the speaker 21 and HDMI connector 26 depending on the specification.

Figure 5:
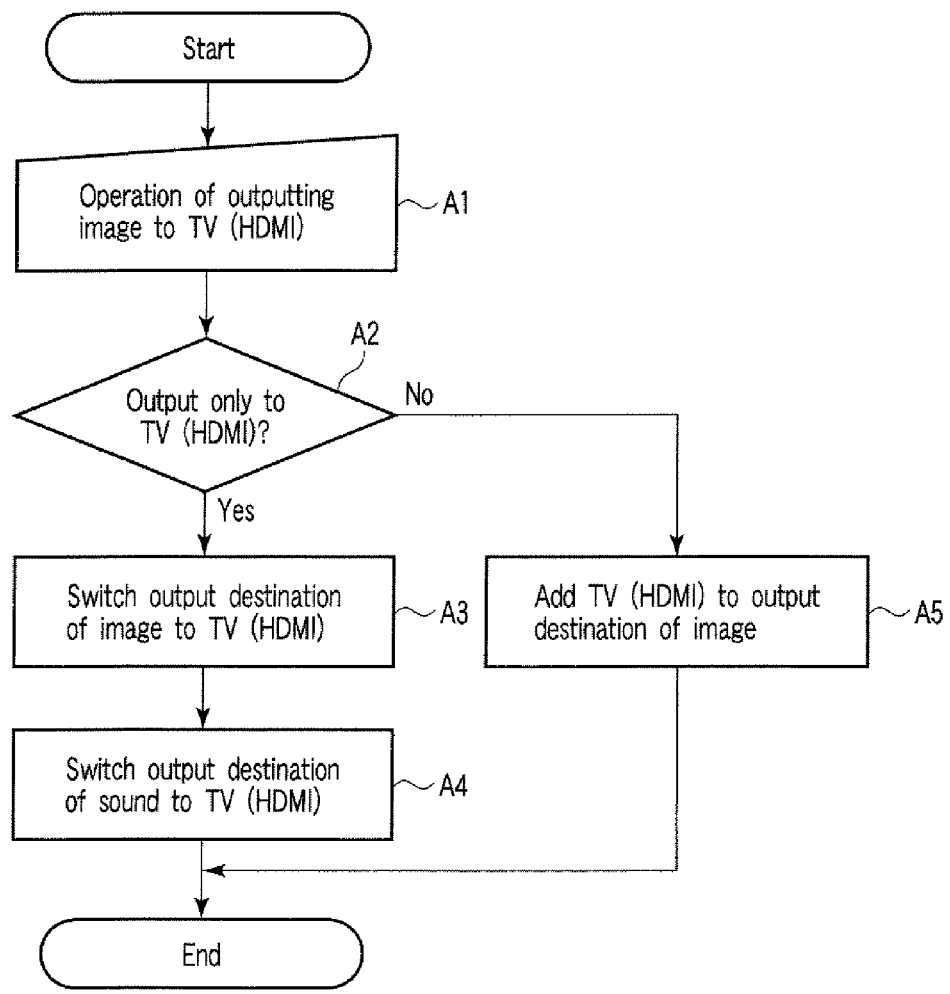
FIG. 5 is an exemplary flowchart showing the operation procedure of an output control operation of an audio signal (with a video signal) performed by the information processing apparatus of the embodiment.

FIG. 5 is an exemplary flowchart showing the operation procedure of an output control operation of an audio signal (with a video signal) performed by the information processing apparatus 1 of the embodiment.

When an operation of causing the video apparatus 2 connected via the HDMI cable "A" to output a video image is performed (block A1), the output destination switching control module 1011 that receives a notification of occurrence of the event checks whether or not the output is set only to the video apparatus 2 (block A2). If it is detected that the output is set only to the video apparatus 2 (YES in block A2), an instruction of switching the output destination of the video signal to the video apparatus 2 is given to the display driver 1001 (block A3) and an instruction of switching the output destination of the audio signal to the video apparatus 2 is given to the sound driver 1002 in conjunction with the above operation (block A4).

On the other hand, if the output is set not only to the video apparatus 2 (NO in block A2), the output destination switching control module 1011 gives an instruction of outputting a video signal to the video apparatus 2 only to the display driver 1001 in addition to display of the video signal on the information processing apparatus 1 (block A5).

In this example, a case where the output destination of the audio signal is automatically switched from the speaker 21 to the HDMI connector 26 in connection with an operation of switching the output destination of the video signal from the display 15 to the HDMI connector 26 when the above operation is performed is explained. Likewise, the output destination switching control module 1011 automatically switches the output destination of the audio signal from the HDMI connector 26 to the speaker 21 in connection with an operation of switching the output destination of the video signal from the HDMI connector 26 to the display 15 when the above operation is performed.

Further, the output destination switching control module 1011 has the following function in addition to the basic function. It is now assumed that the information processing apparatus 1 and video apparatus 2 are connected via the HDMI cable "A" and an image played back by the information processing apparatus 1 is displayed on the video apparatus 2. Further, at this time, it is assumed that an audio signal is output only from the video apparatus 2 and the HDMI cable "A" is disconnected from the HDMI connector 26 since the audio playback operation is terminated, for example.

The display state detection module 1012 acquires the display state of a video signal containing the connection state of the HDMI cable "A" from the OS 100. Then, the display state detection module 1012 which has detected that the HDMI cable "A" is disconnected from the HDMI connector 26 via the OS 100 notifies the output destination switching control module 1011 to that effect. When receiving the notification, the output destination switching control module 1011 gives an instruction of switching the output destination of the audio signal from the HDMI connector 26 to the speaker 21 to the sound driver 1002.

When a state in which a video image is output to both of the information processing apparatus 1 and video apparatus 2 and an audio signal is output only to the video apparatus 2 is considered, the video signal is displayed on the display 15 even if the HDMI cable "A" is disconnected and only the information processing apparatus 1 is kept active. Therefore, the output destination switching operation relating to the video image is not performed. As a result, the chance of switching the output destination of the audio signal to the speaker 21 cannot be attained. By taking the above case into consideration, the output destination switching control module 1011 is designed to have a function of automatically switching the output destination of the audio signal from the HDMI connector 26 to the speaker 21 when detecting that the HDMI cable "A" is disconnected from the HDMI connector 26 based on the notification from the display state detection module 1012.

Further, the personal computer normally has a resume function of restoring the state set at the preceding power-off time when the power source is turned on. In this example, a state in which a suspended state is set up when the information processing apparatus 1 and video apparatus 2 are connected via the HDMI cable "A", an image played back by the information processing apparatus 1 is displayed on both of the information processing apparatus 1 and video apparatus 2 and the audio is output only from the video apparatus 2 is considered. Also, in this case, if the resume process is later performed only by the information processing apparatus 1, the operation of switching the output destination of the video image is not performed since the video signal is displayed on the display 15. Therefore, the chance of switching the output destination of the audio signal to the speaker 21 cannot be attained.

By taking the above case into consideration, the display state detection module 1012 acquires the output states of the restored video signal and audio signal from the OS 100 when the resume process is performed and notifies the result to the output destination switching control module 1011. Then, the output destination switching control module 1011 further has a function of automatically switching the output destination of the audio signal from the HDMI connector 26 to the speaker 21 when the notified content indicate that the output destination the audio signal is set only to the HDMI connector 26 and the output destination of the video signal is set not only to the HDMI connector 26.

Further, as the state in which the video image is displayed on both of the information processing apparatus 1 and video apparatus 2, that is, the video signal is output from both of the display 15 and HDMI connector 26, a state of multi-display in which the same screen is divided and displayed can be considered in addition to a state of clone display in which the same screens are simultaneously displayed in the recent personal computer. The schema of the clone display and multi-display is explained with reference to FIG. 6.

Figure 6:
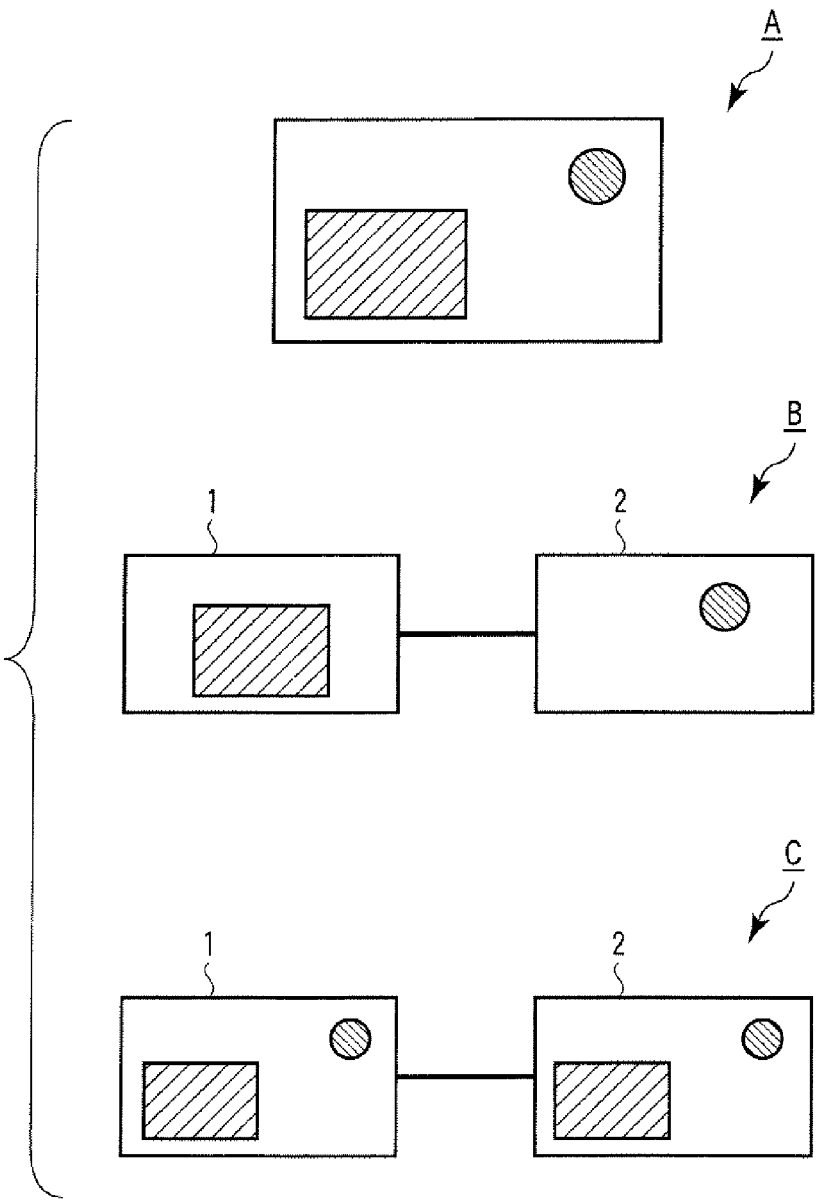
FIG. 6 is an exemplary view schematically showing clone display and multi-display.

"A" in FIG. 6 shows a screen to be displayed. A partial image in a previously selected range of the screen is displayed on each portion in the multi-display mode ("B" of FIG. 6). The whole portion of the screen is displayed on each portion in the clone display mode ("C" of FIG. 6). In the case of multi-display, one of the portions can be set as a primary portion. The primary portion can be dynamically switched. Therefore, the display state detection module 1012 properly acquires information indicating one of the portions that is set as the primary portion from the OS 100 when the multi-display operation is performed and notifies the result to the output destination switching control module 1011. Then, the output destination switching control module 1011 has a function of giving an instruction of switching the output destination of the audio signal between the speaker 21 and HDMI connector 26 to the sound driver 1002 so as to output the audio signal from the primary portion.

Further, as explained before, in the clone display operation, when the clone display operation is started, that is, when the output destination of the video signal is switched to both of the display 15 and HDMI connector 26, the output of the audio signal from the speaker 21 is maintained and the output destination of the audio signal can be automatically switched to both of the display 15 and HDMI connector 26 depending on the specification. However, it is also useful to permit the user to previously select one of the information processing apparatus 1 and video apparatus 2 that outputs the audio signal.

The output destination setting module 1013 provides an interface to permit the user to previously select one of the information processing apparatus 1 and video apparatus 2 that outputs the audio signal at the clone display time. The image/sound output linking utility 101 holds the setting content by the output destination setting module 1013 as setting data 1014. Then, the output destination switching control module 1011 refers to the setting data 1014 at the start time of the clone display and gives an instruction of switching the output destination of the audio signal between the speaker 21 and HDMI connector 26 based on the setting content to the sound driver 1002.

FIG. 7 is an exemplary flowchart showing the operation procedure of an output control operation of an audio signal (with a video signal) performed by the information processing apparatus 1 of the embodiment by taking the multi-display and clone display into consideration.

When the operation of outputting an image to the video apparatus 2 connected via the HDMI cable "A" is performed (block B1), the output destination switching control module 1011 that receives a notification of occurrence of the event checks whether or not the output is set only to the video apparatus 2 (block B2). If the output is set only to the video apparatus 2 (YES in block B2), it gives an instruction of switching the output destination of the video signal to the video apparatus 2 to the display driver 1001 (block B3) and gives an instruction of switching the output destination of the audio signal to the video apparatus 2 to the sound driver 1002 in connection with the above operation (block B4).

On the other hand, if the output is set not only to the video apparatus 2 (NO in block B2), it checks whether or not the display is caused by multi-display (block B5). If the display is caused by multi-display (YES in block B5), the output destination switching control module 1011 gives an instruction of causing the video apparatus 2 to output an image to the display driver 1001 (block B6) in addition to display in the present information processing apparatus 1. At the same time, it gives an instruction of switching the output destination of the audio signal between the information processing apparatus 1 and the video apparatus 2 to the sound driver 1002 (block B7) so as to cause an audio signal to be output from the primary portion.

If the display is caused not by multi-display but by clone display (NO in block B5), the output destination switching control module 1011 gives an instruction of causing the video apparatus 2 to output an image to the display driver 1001 (block B8) in addition to display in the present information processing apparatus 1. At the same time, it gives an instruction of switching the output destination of the audio signal between the information processing apparatus 1 and the video apparatus 2 to the sound driver 1002 (block B9) so as to output an audio signal to a previously selected portion indicated by setting data 1004.

As described above, according to the information processing apparatus 1 of this embodiment, an audio signal can be output to the video apparatus 2 as the user wishes without the necessity of an operation by the user in connection with outputting of the video signal to the video apparatus 2 connected via the HDMI cable "A".

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus, comprising:
    a display;
    a speaker;
    a connector detachably connected to a cable capable of outputting a video signal and audio signal;
    a processor; and
    a memory coupled to the processor, the memory includes an operating system and an output control module that are executed by the processor, wherein
        a display driver being a module of the operating system and configured to control outputting of the video signal with respect to the display and connector in response to video settings,
        a sound driver being a module of the operating system and configured to control outputting of the audio signal with respect to the speaker and connector in response to audio settings that are independently made from the video settings,
        a detecting module configured to detect that the cable is disconnected from the connector,
        a resume module configured to restore a state where suspend is performed and an output control module configured to set audio settings that cause the sound driver to (i) switch an output destination of the audio signal from the speaker to the connector when the operating system notifies the output control module that the display driver has switched a display destination of the video signal from the display to the connector, and (ii) switch the output destination of the audio signal from the connector to the speaker when the detecting module detects that the cable is disconnected from the connector in a state in which the audio signal is output only from the connector and (iii) switch the output destination of the audio signal from the connector to the speaker, when a state in which the audio signal is output only from the connector is restored and a state other than a state in which the video signal is output only from the connector is restored, by the resume module.

2. The information processing apparatus of claim 1, wherein the output control module is further adapted to instruct the sound driver to maintain the output destination of the audio signal from the speaker when the audio signal is output from the speaker and when the operating system notifies the output control module that the display driver has switched the display destination of the video signal from the display to both the display and the connector.

3. The information processing apparatus of claim 2, wherein the switching of the display destination is performed automatically.

4. The information processing apparatus of claim 1, wherein the output control module is further adapted to instruct the sound driver to change the output destination of the audio signal from the speaker to the speaker and the connector when the operating system notifies the output control module that the display driver has switched the display destination of the video signal from the display to both the display and the connector.

5. The information processing apparatus of claim 1, wherein the cable that is detachably connected to the connector comprises a high-definition-multimedia interface (HDMI) cable.

6. The information processing apparatus of claim 1, wherein the memory further comprises the resume module configured to restore the state when suspend is performed in response to a set up at previous power-off time when a power source is turned on.

7. A method conducted by an information processing apparatus configured with a speaker and a display and including a connector adapted for connectivity via a cable to a remotely located video apparatus, the method comprising:
configuring the information processing apparatus with audio settings that cause a sound driver of an operating system for the information processing system to switch an output destination of an audio signal from the speaker to the connector when the operating system provides a first notice that a display driver of the operating system has switched a display destination of a video signal from the display to the connector as a result of an initiation of outputting a display signal to an external display destination; and
configuring the information processing apparatus with audio settings that cause the sound driver to switch the output destination of the audio signal from the connector to the speaker when the operating system provides a second notice that the display driver has switched the display destination of the video signal from the connector to the display as a result of a termination of outputting the display signal to the external display destination;
configuring the information processing apparatus with audio settings that cause the sound driver to switch the output destination of the audio signal from the connector to the speaker in response to the cable being disconnected from the connector; and
configuring the information processing apparatus with audio settings that cause the sound driver to switch the output destination of the audio signal from the connector to the speaker when a state in which the audio signal is output only from the connector is restored and a state other than a state in which the video signal is output only from the connector is restored, by the resume module.

8. The method of claim 7 further comprising:
configuring the information processing apparatus with audio settings that cause the sound driver to maintain the output destination of the audio signal from the speaker when the audio signal is output from the speaker and when the operating system provides a third notice that the display driver has switched the display destination of the video signal from the display to both the display and the connector.

9. The method of claim 8, wherein the configuring of the information processing apparatus with the audio settings is performed automatically.

10. The method of claim 7 further comprising:
configuring the information processing apparatus with the audio settings that cause the sound driver to switch the output destination of the audio signal from the connector to the speaker when the operating system provides the second notice that the display driver has switched the display destination of the video signal from both the display and the connector to the display.

11. The method of claim 7, wherein the information processing apparatus is a notebook personal computer.

12. An apparatus, comprising:
a processor;
a memory coupled to the processor, the memory comprises an operating system stored within the memory and executable by the processor, the operating system comprises (1) a display driver configured to control an output of a video signal to one of a display and a connector, and (2) a sound driver configured to control an output of an audio signal to one of a speaker and the connector independently of the display driver, a resume module configured to restore a state where suspend is performed and (3) an output control module configured to control audio settings that cause the sound driver to (i) switch an output destination of the audio signal from the speaker to the connector when the operating system notifies the output control module that the display driver has switched a display destination of the video signal from the display to the connector, (ii) switch the output destination of the audio signal from the connector to the speaker when the operating system notifies the output control module that the display driver has switched the display destination of the video signal from the connector to the display, (iii) switch the output destination of the audio signal from the connector to the speaker in response to detecting that the cable is disconnected from the connector; and (iv) switch the output destination of the audio signal from the connector to the speaker when a state in which the audio signal is output only from the connector is restored and a state other than a state in which the video signal is output only from the connector is restored, by the resume module.

13. The apparatus of claim 12, wherein the output control module is further configured to control audio settings that cause the sound driver to maintain the output of the audio signal when the audio signal is output from the speaker and upon receipt of a notification from the operating system that the display driver has switched the display destination of the video signal from the display to both the display and the connector.

14. The apparatus of claim 13, wherein the output control module is further configured to control the audio settings automatically.

15. The apparatus of claim 12, wherein the output control module is further configured to control audio settings that cause the sound driver to change the output destination of the audio signal from the speaker to the speaker and the connector when the operating system notifies the output control module that the display driver has switched the display destination of the video signal from the display to both the display and the connector.

* * * * *